(12) United States Patent
Li et al.

(10) Patent No.: US 10,432,460 B2
(45) Date of Patent: Oct. 1, 2019

(54) NETWORK SERVICE SCALING METHOD AND APPARATUS

(71) Applicant: HUAWEI TECHNOLOGIES CO., LTD., Shenzhen, Guangdong (CN)

(72) Inventors: Shitao Li, Nanjing (CN); Deepanshu Gautam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 15/817,560

(22) Filed: Nov. 20, 2017

(65) Prior Publication Data

US 2018/0077020 A1    Mar. 15, 2018

Related U.S. Application Data

(63) Continuation of application No. PCT/CN2015/093691, filed on Nov. 3, 2015.

(30) Foreign Application Priority Data

May 21, 2015   (CN) .......................... 2015 1 0262520

(51) Int. Cl.
 *G06F 15/177* (2006.01)
 *H04L 12/24* (2006.01)
 (Continued)

(52) U.S. Cl.
 CPC ...... *H04L 41/0816* (2013.01); *G06F 9/45558* (2013.01); *G06F 9/5077* (2013.01);
 (Continued)

(58) Field of Classification Search
 CPC .............. H04L 41/0816; H04L 41/0896; H04L 41/5054; H04L 41/082; H04L 67/16;
 (Continued)

(56) References Cited

U.S. PATENT DOCUMENTS 6,760,775 B1 *   7/2004   Anerousis ............... H04L 29/06
                                                         709/229
9,716,626 B1 *   7/2017   Herzog .................. H04L 41/082
                            (Continued)

FOREIGN PATENT DOCUMENTS

CN           103634225 A     3/2014
CN           104219127 A    12/2014
                (Continued)

OTHER PUBLICATIONS

International Search Report in International Application No. PCT/CN2015/093691, dated Feb. 18, 2016, 6 pages.
(Continued)

*Primary Examiner* — Krisna Lim
(74) *Attorney, Agent, or Firm* — Fish & Richardson P.C.

(57) ABSTRACT

The present invention provides a virtualized network function scaling method and an apparatus. The method includes: receiving a network service scaling request, the request includes a deployment flavor identifier, the network service includes an instance of a first VNF (VNF1) and an instance of a second VNF (VNF2), VNF instances are connected by using an instance of a first VL (VL1); obtaining a deployment flavor and adding a new instance of the VNF1; obtaining a modification policy of the VL1; generating descriptor of a second VL based on information about a connection point of the new instance of the VNF1; creating an instance of the second virtual link according to the descriptor of the second VL, to connect the new instance of the VNF1 to the instance of the VNF2. In this solution, a new VNF instance obtained after service scaling can be connected to another VNF instance.

14 Claims, 10 Drawing Sheets

(51) Int. Cl.
*H04L 29/06* (2006.01)
*H04L 29/08* (2006.01)
*G06F 9/455* (2018.01)
*G06F 9/50* (2006.01)

(52) U.S. Cl.
CPC ............ *H04L 29/06* (2013.01); *H04L 41/082* (2013.01); *H04L 41/0893* (2013.01); *H04L 41/0896* (2013.01); *H04L 41/5045* (2013.01); *H04L 41/5054* (2013.01); *H04L 67/10* (2013.01); *H04L 67/16* (2013.01); *G06F 2009/45595* (2013.01)

(58) Field of Classification Search
CPC . H04L 67/10; H04L 41/0893; H04L 41/5045; H04L 29/06; G06F 9/5077; G06F 9/4558; G06F 2009/45595
USPC .......................................................... 709/221
See application file for complete search history.

(56) References Cited

U.S. PATENT DOCUMENTS

| | | | | |
|---|---|---|---|---|
| 9,935,829 | B1* | 4/2018 | Miller | H04L 41/0816 |
| 2003/0189930 | A1* | 10/2003 | Terrell | H04L 45/00 370/389 |
| 2008/0008202 | A1* | 1/2008 | Terrell | H04L 45/00 370/401 |
| 2015/0063166 | A1* | 3/2015 | Sif | G06F 9/45558 370/254 |
| 2016/0043944 | A1* | 2/2016 | Felstaine | H04L 45/70 370/389 |
| 2017/0331862 | A1 | 11/2017 | Wang et al. | |
| 2018/0034781 | A1* | 2/2018 | Jaeger | H04L 63/20 |

FOREIGN PATENT DOCUMENTS

| | | |
|---|---|---|
| CN | 104253866 A | 12/2014 |
| CN | 104270428 A | 1/2015 |
| CN | 104468162 A | 3/2015 |
| CN | 104518935 A | 4/2015 |
| CN | 104601592 A | 5/2015 |
| EP | 2849064 A1 | 3/2015 |
| WO | 2015031866 A1 | 3/2015 |
| WO | 2015043168 A1 | 4/2015 |
| WO | 2015065353 A1 | 5/2015 |

OTHER PUBLICATIONS

Chinese Office Action issued in Chinese Application No. 201510262520.4 dated Nov. 28, 2018, 3 pages.
Chinese Search Report issued in Chinese Application No. 2015102625204 dated Nov. 13, 2018, 3 pages.
XP014181857 GS NFV-MAN 001 V0.5.0 (May 2014),Network Function Virtualization (NFV) Management and Orchestration,dated Apr. 2014,total 194 pages.
XP014228548 Fujitsu,"Editorial clean-up",DGS/NFV-MAN001 Version of the draft which this CR refers to: 0.5.0,dated Jun. 2014,total 344 pages.
XP014235740 ETSI GS NFV-MAN 001 V1.1.1 (Dec. 2014),Network Function Virtualization (NFV) Management and Orchestration,dated Dec. 2014,total 184 pages.
Extended European Search Report issued in European Application No. 15892421.7 dated Mar. 29, 2018, 11 pages.

* cited by examiner

NETWORK SERVICE SCALING METHOD AND APPARATUS

CROSS-REFERENCE TO RELATED APPLICATIONS

This application is a continuation of International Application No. PCT/CN2015/093691, filed on Nov. 3, 2015, which claims priority to Chinese Patent Application No. 201510262520.4, filed on May 21, 2015, The disclosures of the aforementioned applications are hereby incorporated by reference in their entireties.

TECHNICAL FIELD

The present invention relates to cloud computing technologies, and in particular, to a network service scaling method and an apparatus.

BACKGROUND

In network functions virtualization (NFV), a general-purpose hardware device and a virtualization technology are used to fulfill a function of a dedicated device in a conventional network, so as to reduce high deployment costs of the dedicated device. Software is not bound to dedicated hardware, so that a function of a network device no longer depends on the dedicated hardware. In addition, cloud computing is used, so that resources can be shared fully and flexibly, new services can be rapidly developed and deployed, and automatic deployment, auto scaling, fault isolation, fault self-recovery, and the like can be implemented based on an actual service requirement. In an NFV architecture, a party that receives an instantiation request and performs instantiation processing on a corresponding service (deploys the service) according to the request is referred to as a virtualization service provider (service provider for short), and a party that initiates the instantiation request is referred to as a service requester.

A virtualized network service (NS) in NFV may be, for example, an IP multimedia subsystem (IMS) network service, or an evolved packet core (EPC) service. One NS may include multiple virtualized network function (VNF) modules, which are also referred to as virtualized network elements. A VNF is a software implementation of a network function that may be deployed in an NFV infrastructure. During virtualization deployment of an NS, a service requester first needs to submit network service descriptor (NSD) to a service provider. The NSD mainly describes a topology of the network service and descriptor of included VNFs (VNF descriptor, VNFD). In the topology, a connection between VNFs is described by using virtual link (VLD). The VNFD describes a constitution, for example, software that runs, and information about a required virtual resource, of each VNF. The virtual resource includes a CPU resource, a storage resource, and the like.

FIG. 1 is a schematic diagram of connecting multiple VNFs by using a virtual link (VL) in NFV. A network service (NS) shown in FIG. 1 mainly includes three VNFs that are connected by using VLs. Each VNF is connected to a VL by using a connection point (connection point, CP). A connection point may be an address of a virtual network adapter or a virtual port number. Descriptor of a virtual link mainly includes a connection point and a connection type, and may further include a parameter such as a root node requirement, a leaf node requirement, service quality, or an interface. A virtual link VL1 in FIG. 1 includes connection points: a CP2, a CP3 and a CP4, and a connection type of the CPs may be an E-TREE tree mode or an E-LAN bus mode. A VL2 includes connection points: a CP1 and a CP5, and a connection type of the CPs is an E-LINE point-to-point mode. As defined in NFV, one connection point can be connected only to one VL, and one VL includes only one connection point for one VNF instance. If one VNF instance needs to be connected to multiple VLs, the VNF instance needs to include multiple connection points, for example, because a VNF1 and a VNF3 in FIG. 1 each are connected to two VLs, the VNF1 and the VNF3 each include two connection points.

Currently, three connection types are defined in NFV, and are respectively the E-LINE (point-to-point mode), the E-TREE (tree mode), and the E-LAN (bus mode). FIG. 2 shows three connection types of virtual links. A virtual link of the E-LINE type can be used to connect only two VNFs, that is, the VL of this type includes only two connection points. A virtual link of the E-TREE type can be used to connect multiple VNFs, and a root node and a leaf node are defined in this type. For example, in FIG. 2, an end connected to a VNF1 is defined as a root node, and ends connected to a VNF2 and a VNF3 are defined as leaf nodes. Therefore, the root node (VNF1) can send a message to any leaf node (that is, send messages to the VNF2 and the VNF3). However, the leaf nodes can send a message only to the root node, but the leaf nodes cannot send a message to each other, that is, the VNF2 cannot send a message to the VNF3. The E-LAN bus type may also be used to connect multiple VNFs. Each VNF can send a message to a bus. The bus may send a message to all other VNFs on the VL in a broadcast manner. Each VNF checks the message after receiving the message. The message carries address information of a target VNF. Only the target VNF processes the message after receiving the message, and other VNFs discard the message after receiving the message.

An NSD may include one or more service deployment flavors. Each deployment flavor includes a deployment configuration parameter set of a network service. Requirements on various resources, such as a CPU and a memory, of the service are specified by deployment configuration parameters in the deployment configuration parameter set. Different service deployment flavors separately correspond to different service indicators, for example, a low indicator, a medium indicator, and a high indicator. The service may be initially deployed according to a low-indicator flavor. When the service runs for a period of time and reaches a peak hour, a service requester may require auto scaling to be performed on the network service, for example, require the network service to be scaled to a high-indicator deployment flavor. After a VNF resource scaling or new instance adding procedure is completed, a network functions virtualization orchestrator (NFVO) performs resource updating on a VNF. After the resource updating is completed, the NFVO returns an auto scaling success response to the service requester.

For VNF descriptor used in the prior art, scaling and a connection of only one VNF are considered during auto scaling. However, one NS may include multiple VNFs, and a deployment flavor requires an instance to be added only for one or more of the VNFs. The prior art does not show how to connect the one or more VNFs to another VNF in the NS after a quantity of instances of the one or more VNFs is changed.

As shown in FIG. 3, in the E-LINE mode, one NS includes two VNFs: a VNF1 and a VNF2. Because a deployment flavor A requires only one instance of the VNF1, a type of a VL between the VNF1 and the VNF2 is the E-LINE. As the service runs, when the service needs to be automatically scaled to a flavor B, two instances of the VNF1 are required. Because the type of the VL between the VNF1 and the VNF2 is initially the E-LINE mode in a definition of an NSD, and one instance of the VNF1 is added when the service needs to be scaled to the flavor B, the original VL of the E-LINE mode apparently cannot meet the requirement, and cannot connect an instance 2 of the VNF1 to an instance 1 of the VNF2.

For the E-TREE and the E-LAN, if a VNF instance and a corresponding connection point are newly added, because the newly added VNF instance and connection point are not included in a definition of an initial VL, when a service is automatically scaled to a flavor B, the newly added connection point cannot be directly connected to the original VL.

In conclusion, in a current auto scaling solution in which VNF descriptor and a VL are used, only how to add a VNF instance is considered, but how to connect the newly added VNF instance to another VNF to which the newly added VNF instance needs to be related is not considered in the current solution. Therefore, according to a current description of an NSD, the newly added VNF instance cannot be successfully connected to another VNF instance in a service.

SUMMARY

The present invention provides a network service scaling method and an apparatus, so as to resolve a prior-art problem that a newly added VNF instance cannot be connected to another VNF instance in a service after network service scaling.

According to a first aspect, an embodiment of the present invention provides a network service scaling method. The method includes: receiving, by a computer apparatus, a network service scaling request, where the scaling request includes a deployment flavor identifier used during the network service scaling, the network service includes an instance of a first virtualized network function and an instance of a second virtualized network function, and the instance of the first virtualized network function and the instance of the second virtualized network function are connected by using an instance of a first virtual link; obtaining a deployment flavor of the network service according to the deployment flavor identifier, where the deployment flavor includes a deployment configuration parameter of the network service; adding a new instance of the first virtualized network function based on the deployment configuration parameter, where the new instance of the first virtualized network function includes one connection point; obtaining a modification policy of the first virtual link from the deployment configuration parameter, and generating descriptor of a second virtual link based on the modification policy of the first virtual link and information about the connection point of the new instance of the first virtualized network function; and creating an instance of the second virtual link based on the descriptor of the second virtual link, where the instance of the second virtual link connects the new instance of the first virtualized network function to the instance of the second virtualized network function.

With reference to the first aspect, in a first possible implementation of the first aspect, the modification policy of the first virtual link indicates a type to which the first virtual link can be changed and a quantity of connection points that can be added.

With reference to the first possible implementation of the first aspect, in a second possible implementation, the generating descriptor of a second virtual link specifically includes: obtaining descriptor of the first virtual link according to the deployment configuration parameter; and changing a type and information about a connection point in the descriptor of the first virtual link according to the modification policy of the first virtual link and the information about the connection point of the new instance of the first virtualized network function, to generate the descriptor of the second virtual link.

With reference to the first aspect, in a third possible implementation of the first aspect, when the modification policy of the first virtual link indicates that the instance of the first virtual link cannot be modified, the method further includes: obtaining descriptor of the second virtualized network function; determining, according to the descriptor of the second virtualized network function, that the second virtualized network function includes a deployment flavor matching the deployment flavor used during the network service scaling; and performing resource updating on the instance of the second virtualized network function according to a deployment configuration parameter in the matching deployment flavor of the second virtualized network function, where the resource updating includes adding a connection point.

With reference to the third possible implementation of the first aspect, in a fourth possible implementation, the generating descriptor of a second virtual link specifically includes: obtaining descriptor of the first virtual link; and replacing information, in the descriptor of the first virtual link, about a connection point of the original instance of the first virtualized network function with the information about the connection point of the new instance of the first virtualized network function, and replacing information, in the descriptor of the first virtual link, about an original connection point of the instance of the second virtualized network function with information about a newly added connection point of the instance of the second virtualized network function, to generate the descriptor of the second virtual link.

According to a second aspect, an embodiment of the present invention provides a computer apparatus, including: a receiving unit, a scaling operation unit, a VLD generation unit, and a connection instance creation unit. The receiving unit is configured to receive a network service scaling request, where the scaling request includes a deployment flavor identifier used during the network service scaling, the network service includes an instance of a first virtualized network function and an instance of a second virtualized network function, and the instance of the first virtualized network function and the instance of the second virtualized network function are connected by using an instance of a first virtual link. The scaling operation unit is configured to: obtain a deployment flavor of the network service according to the deployment flavor identifier, where the deployment flavor includes a deployment configuration parameter of the network service, and add a new instance of the first virtualized network function according to the deployment configuration parameter, where the new instance of the first virtualized network function includes one connection point. The VLD generation unit is configured to: obtain a modification policy of the first virtual link according to the deployment configuration parameter, and generate descriptor of a second virtual link based on the modification policy of the first virtual link and information about the connection point of the new instance of the first virtualized network function. The connection instance creation unit is configured to create an instance of the second virtual link based on the descriptor of the second virtual link, where the instance of the second virtual link connects the new instance of the first virtualized network function to the instance of the second virtualized network function.

According to a third aspect, an embodiment of the present invention provides a non-transitory computer readable medium for storing an instruction, where the instruction may be executed by one or more processors to complete the following operations:

receiving a network service scaling request, where the scaling request includes a deployment flavor identifier used during the network service scaling, the network service includes an instance of a first virtualized network function and an instance of a second virtualized network function, and the instance of the first virtualized network function and the instance of the second virtualized network function are connected by using an instance of a first virtual link;

obtaining a deployment flavor of the network service according to the deployment flavor identifier, where the deployment flavor includes a deployment configuration parameter of the network service;

adding a new instance of the first virtualized network function according to the deployment configuration parameter, where the new instance of the first virtualized network function includes one connection point;

obtaining a modification policy of the first virtual link according to the deployment configuration parameter, and generating descriptor of a second virtual link based on the modification policy of the first virtual link and information about the connection point of the new instance of the first virtualized network function; and creating an instance of the second virtual link based on the descriptor of the second virtual link, where the instance of the second virtual link connects the new instance of the first virtualized network function to the instance of the second virtualized network function.

It can be learned from the foregoing technical solutions that, in the network service scaling method provided in the present invention, a network service scaling request includes a deployment flavor identifier used during service scaling. A modification policy of a first virtual link is obtained from a deployment configuration parameter that corresponds to the deployment flavor identifier. After a new instance of a first virtualized network function is added, descriptor of a second virtual link is generated according to the modification policy of the first virtual link and a connection point of the newly added instance of the first virtualized network function, and then, an instance of the second virtual link is created. The new instance of the first virtualized network function and an instance of a second virtualized network function are connected by using the instance of the second virtual link. In this method, the new instance of the first virtualized network function can be successfully connected to an original virtualized network service during scaling of the first virtualized network function.

BRIEF DESCRIPTION OF DRAWINGS features of the present invention are described by using non-limitative embodiments and with reference to the accompanying drawings.

DESCRIPTION OF EMBODIMENTS

To make the purpose, technical solutions, and advantages of the embodiments of the present invention clearer, the following clearly describes the technical solutions of the embodiments of the present invention with reference to the accompanying drawings in the embodiments of the present invention.

Figure 1:
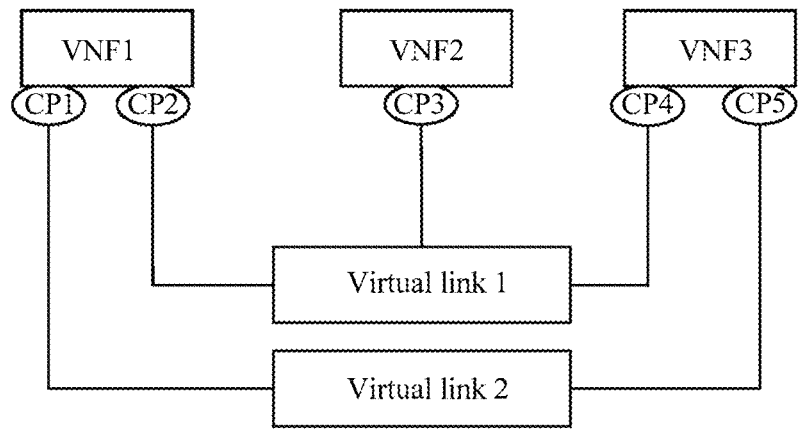
FIG. 1 is a schematic diagram of connecting multiple VNFs in a network functions virtualization environment.
Figure 2:
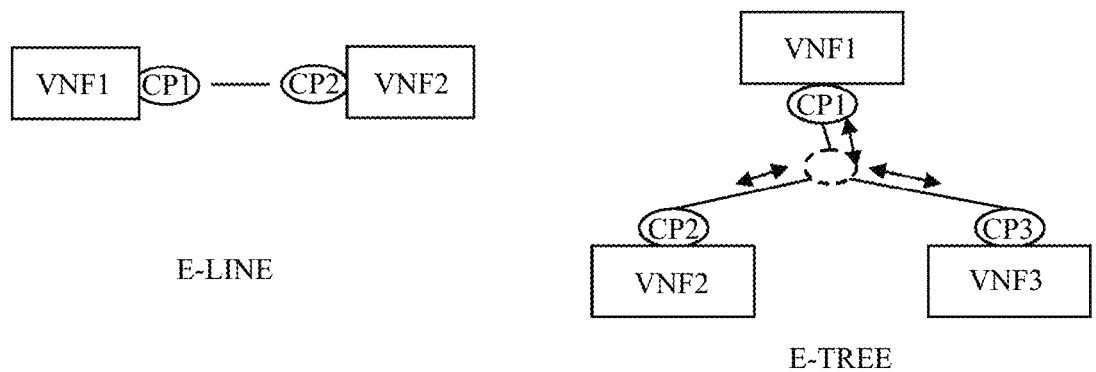
FIG. 2 is a schematic diagram of three connection types of a virtual link.
Figure 2:
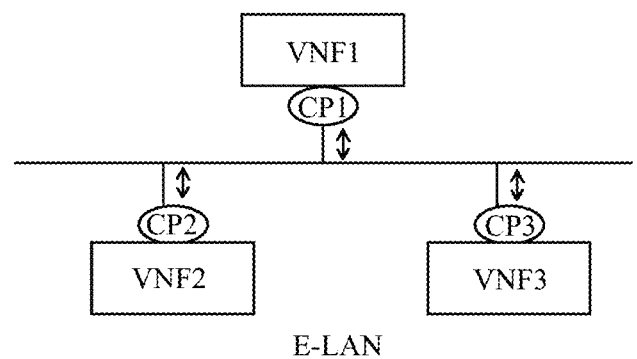
Figure 3:
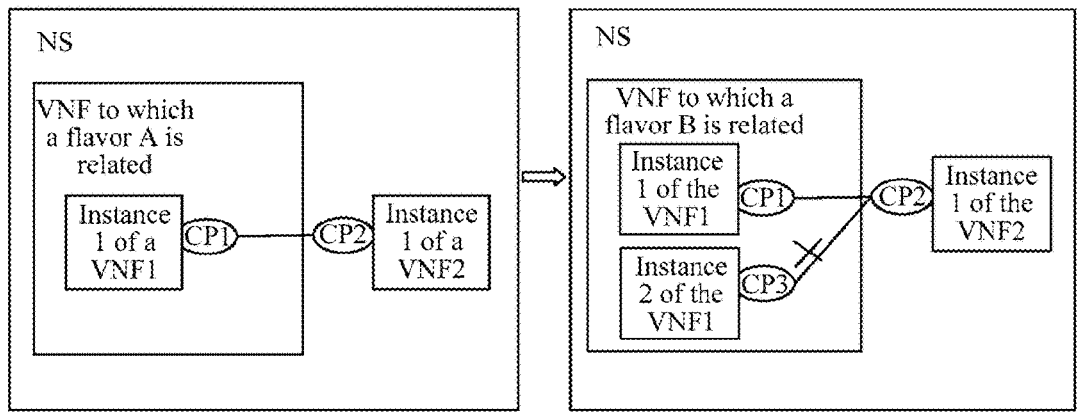
FIG. 3 is a schematic diagram of connections between VNFs during VNF scaling in the prior art.
Figure 4:
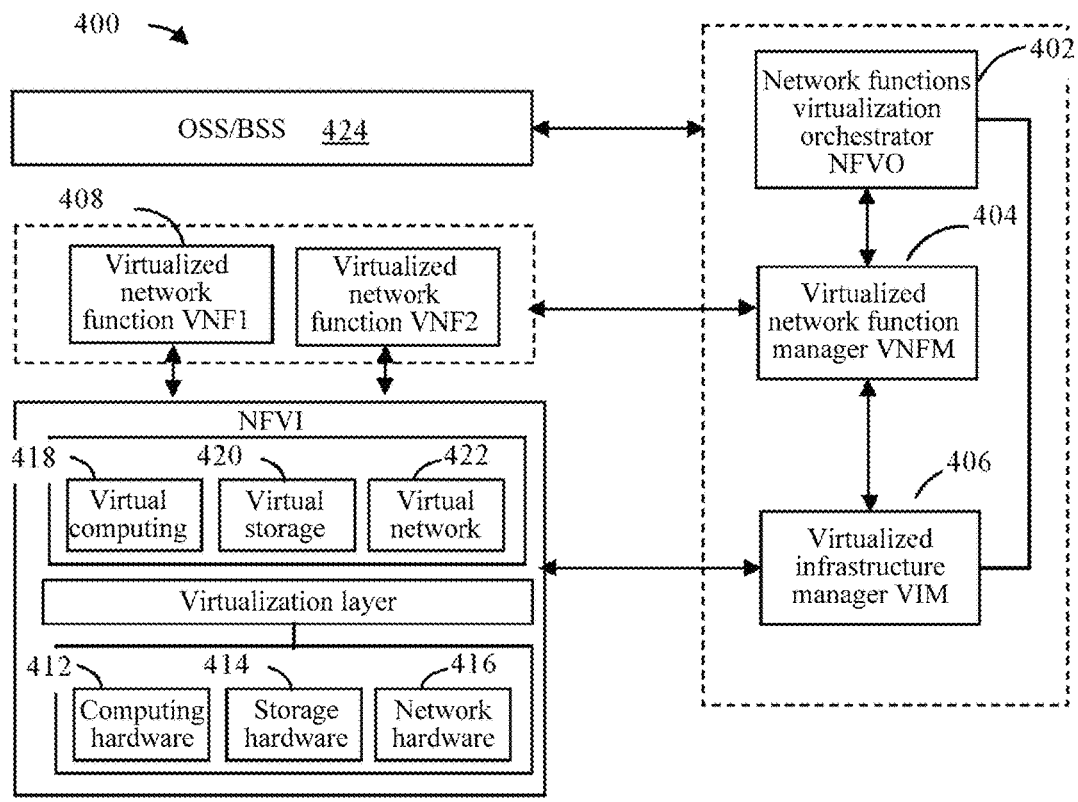
FIG. 4 is a diagram of a network architecture of network functions virtualization according to an embodiment of the present invention.

FIG. 4 provides a schematic architectural diagram of an NFV system 400 according to an embodiment of the present invention. The NFV system 400 includes the following functional components: a network functions virtualization orchestrator (NFVO) 402, a virtualized network function manager (VNFM) 404, a virtualized infrastructure manager (VIM) 406, a network functions virtualization infrastructure (NFVI), multiple virtualized network functions (VNFs) 408, and an operations support system and business support system (Operations Support System and Business Support System, OSS/BSS) 424.

The network functions virtualization orchestrator (NFVO) 402 is mainly responsible for performing lifecycle management of a virtualization service, allocating and scheduling a virtual resource in the virtualized infrastructure, that is, the NFVI, and the like. The NFVO 402 may communicate with one or more virtualized network function managers (VNFM) 404, to execute a resource-relevant request, send configuration information to the VNFM 404, and collect status information of the VNF 408. In addition, the NFVO 402 may also communicate with the virtualized infrastructure manager (VIM) 406, to allocate and/or reserve a resource, and exchange configuration information and status information of a virtual hardware resource.

The virtualized network function manager (VNFM) 404 is responsible for lifecycle management of one or more VNFs, for example, responsible for instantiating, updating, querying, scaling, or terminating the VNF 408. The VNFM 404 may communicate with the VNF 408 to complete lifecycle management of the VNF and exchange of configuration information and status information. An NFV architecture may include multiple VNFMs that are responsible for performing lifecycle management on different types of VNFs.

The virtualized infrastructure manager (VIM) 406 controls and manages interaction between the VNF 408 and computing hardware 412, storage hardware 414, network hardware 416, virtual computing 418, a virtual storage 420, and a virtual network 422. For example, the VIM 406 executes a resource management function, including an infrastructure resource management function, an allocation function (for example, addition of a resource to a virtual container), and an operational function (for example, collection of fault information of the NFVI). The VNFM 404 and the VIM 406 may communicate with each other, to request resource allocation and exchange configuration information and status information of a virtual hardware resource.

The network functions virtualization infrastructure (NFVI) is an NFV infrastructure layer and includes a hardware component, a software component, or a combination thereof, so as to create a virtualization environment and deploy, manage, and implement the VNF 408. A virtualization layer of a hardware resource is used to provide virtual resources, for example, VMs and a virtual container in another form, to the VNF 408. The hardware resource includes the computing hardware 412, the storage hardware 414, and the network hardware 416. In an implementation, resources of the computing hardware 412 and the storage hardware 414 may be pooled together. The virtualization layer in the NFVI may abstract the hardware resource, and decouple the VNF 408 from an underlying physical network layer. The virtual resource includes the virtual computing 418 (for example, virtual machines, VMs), the virtual storage 420, and the virtual network 422. The virtual computing 418 and the virtual storage 420 are provided to the VNF 408 in a form of VMs and/or other virtual containers by using a hypervisor. For example, one or more VNFs 408 may be deployed on one VM. The virtualization layer abstracts the network hardware 416 to form the virtual network 422. The virtual network 422 includes virtual switches (Vswitches), and provides connections between VMs and/or other virtual containers that hold VNFs.

The multiple virtualized network functions (VNFs) 408 are configured to be virtualization of at least one network function. The VNF 408 may be a virtualized provider edge (PE) node, and is configured to provide all PE network functions on a non-virtualized PE device, for example, a router, a switch, a bridge, a server, or a cloud computing system. Each VNF runs in one virtual container, and corresponds to one group of network functions that belong to one or more physical devices.

The operations support system and business support system (Operations Support System and Business Support System, OSS/BSS) 424 supports various end-to-end telecommunication services. Management functions supported by the OSS include network configuration, service provisioning, fault management, and the like. The BSS processes an order, payment, revenue, and the like, and supports product management, order management, revenue management, and customer management.

Because virtualized network function (VNF) entities are virtualization of one or more network functions, and correspond to a network function of one or more physical network elements, the virtualized network function entities are also referred to as virtualized network elements. As described above, when a network service needs to be scaled, a quantity of virtualized network function instances may need to be increased, and connection relationships also need to be modified or increased accordingly.

Figure 5:
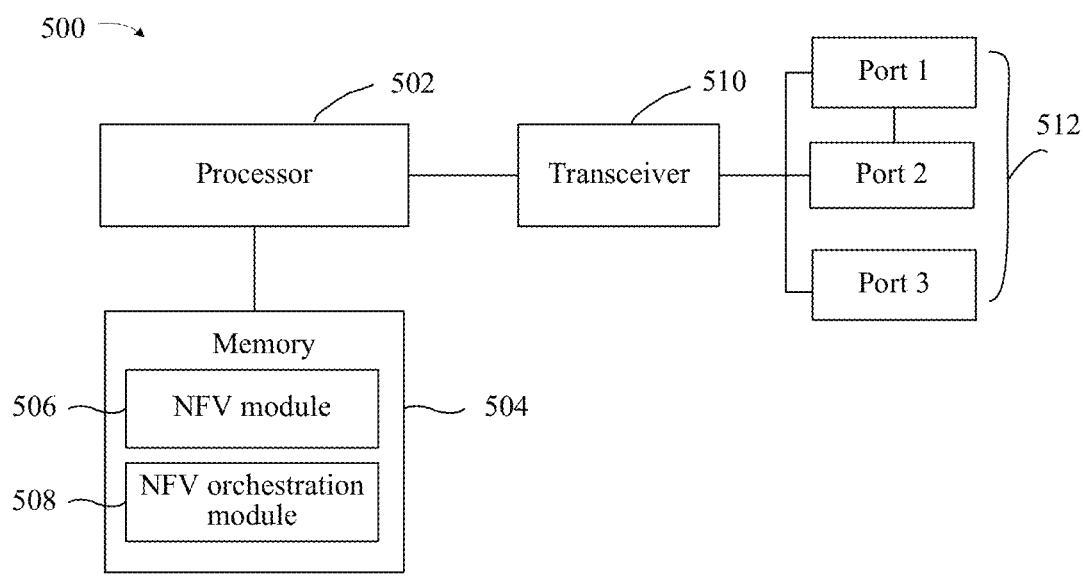
FIG. 5 is a schematic structural diagram of a network element according to an embodiment of the present invention.

FIG. 5 is a schematic structural diagram of a network element (500) according to an embodiment of the present invention. The network element is configured to transmit or process data in the NFV system 400 shown in FIG. 4. The network element 500 is configured to create, modify, relocate, and/or migrate one or more virtual machines. The network element 500 may be further configured to hold (host), store, and/or execute one or more network functions. The network element 500 may be a sub-component, for example, the NFVO 402, in the NFV system in FIG. 4.

The network element 500 may include one or more ports 512 that are coupled to a transceiver 510. The transceiver 510 may be a transmitter, a receiver, or a combination thereof, and sends a data packet to or receives a data packet from another network node by using the port 512. A processor 502 is coupled to the transceiver 510, and is configured to: process a data packet, and determine nodes for sending a data packet. The processor 502 may include one or more multi-core processors and/or a memory 504. The processor 502 may be a general-purpose processor, an application specific integrated circuit (ASIC), or a digital signal processor (DSP).

The memory 504 may be a non-transitory storage medium, is coupled to the processor 502, and is configured to store different types of data. The memory 504 may include a read only memory (ROM), a random access memory (RAM), or another type of dynamic storage device that can store information and an instruction, or may be a magnetic disk storage. The memory 504 may be configured to store an instruction for implementing the NFV system or a related method. For example, the memory 504 functions as the VNFM 404, the VNF 408, and the orchestrator 402. In an implementation, the memory 504 may include an NFV module 506. The NFV module may be implemented on the processor 502. The NFV module 506 may be configured to hold (host), store, and implement network functions of one or more virtualized network devices. In another implementation, the memory 504 may further include an NFV orchestration module 508, configured to create, modify, relocate, and/or migrate one or more virtual machines. It can be understood that by means of programming or loading an executable instruction onto at least one of the processor 502, a cache, or a long-term memory of the network element 500, the network element 500 may be converted into a particular device, for example, a router or a switch.

The network element 500 may implement functions of one or more VNFs and execute one or more instructions according to this embodiment of the present invention, to scale the VNF. These instructions may be stored in the memory 504, or may be integrated into a kernel or a plug-in of a kernel of an operating system of the network element.

In an embodiment, a network service including an instance of a VNF1 and an instance of a VNF2 runs on the network element 500. The instance of the VNF1 and the instance of the VNF2 are connected by using an instance of a first virtual link (VL1).

After the network element receives, by using the transceiver 510, a network service scaling request that includes a deployment flavor identifier used during network service scaling, the network element 500 obtains, by executing a first instruction, a deployment flavor that corresponds to the deployment flavor identifier used during the scaling. The deployment flavor includes a deployment configuration parameter of the network service. The network element adds, by executing a second instruction, a new instance of the VNF1 according to the deployment configuration parameter. The new instance of the VNF1 includes one connection point. The network element obtains, by executing a third instruction, a modification policy of the VL1 according to the deployment configuration parameter, and generates descriptor of a second virtual link (VL2) based on the modification policy of the VL1 and the connection point of the new instance of the VNF1. The network element creates, by executing a fourth instruction, an instance of the VL2 according to the generated descriptor of the VL2. The instance of the VL2 connects the new instance of the VNF1 to the instance of the VNF2.

Figure 6:
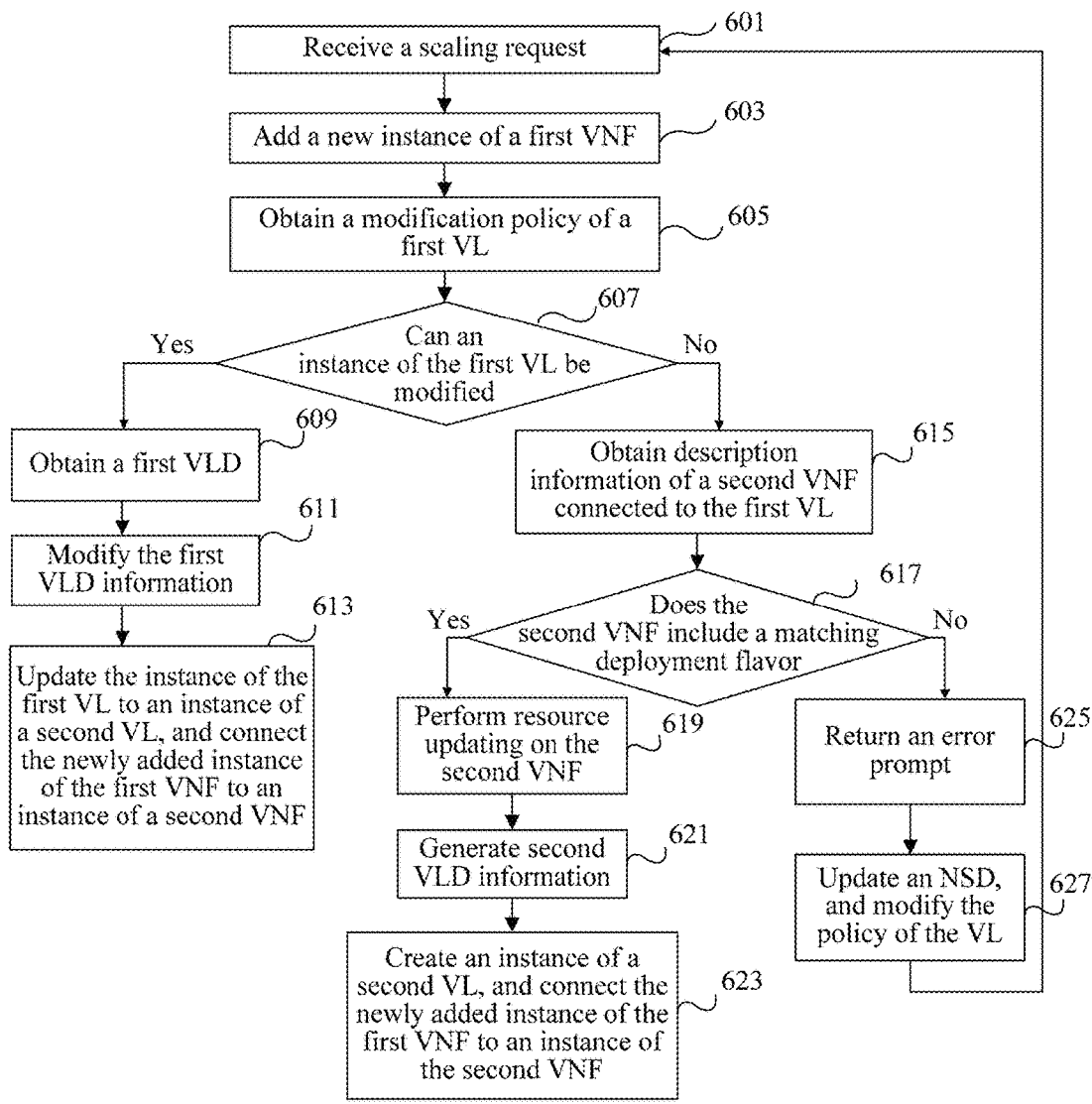
FIG. 6 is a schematic flowchart of network service scaling according to an embodiment of the present invention.

As shown in FIG. 6, FIG. 6 is a flowchart of network service scaling. In this method, a deployment configuration parameter in a deployment flavor (deployment flavor) in an existing NSD is extended, a modification policy of a virtual link (VL) that is used during scaling is added, policy analysis is performed on a VL that is related to a newly added instance of a virtualized network function, and a VL instance is modified or a new VL instance is created, to ensure that the newly added instance of the virtualized network function is connected to an original network service.

In this embodiment, the network service (NS) includes an instance of a first VNF and an instance of a second VNF. During auto scaling, the instance of the first VNF needs to be scaled, to add one new instance of the first VNF. The scaling method in this embodiment may be performed in the NFV system 400 shown in FIG. 4, or may be specifically performed by using a device that is in a form of the network element shown in FIG. 5.

The virtualized network function scaling method in this embodiment includes the following steps.

Step 601: An NFVO 402 receives a network service scaling request sent by a requester, where the scaling request includes a deployment flavor identifier used during the network service scaling.

The scaling request includes the service deployment flavor identifier (flavor ID). A deployment flavor to which a network service needs to be scaled is obtained by using the flavor ID, and the deployment flavor includes deployment configuration parameter information of a VNF included in the network service. In this embodiment, the network service includes an instance of a first virtualized network function (VNF1) and an instance of a second virtualized network function (VNF2). The instance of the VNF1 is connected to the instance of the second virtualized network function: the VNF2 by using a first virtual link (VL1).

A parameter of a virtual link may be added to a deployment configuration parameter of a VNF, to indicate a modification policy, used during scaling, of the VL connected to the VNF. Another parameter of the VL indicates an identifier of the VL. In this way, after receiving a deployment configuration parameter of the VNF1 in the service, a modification policy of the VL1 may be obtained from a relevant VL parameter in the deployment configuration parameter of the VNF 1.

Specifically, the requester may be a service server of a service provider SP, or may be a monitor (monitor) in the NFV system. The monitor can automatically request scaling when service resources are insufficient. For example, when the service starts to be deployed, the service is initially deployed according to a low-indicator flavor A. For example, the flavor A requires 600 calls to be connected per second. A corresponding VNF requirement is that the VNF1 includes one instance, and the VNF2 includes two instances. When the service runs for a period of time and reaches a peak hour, the initial deployment cannot meet a requirement of the service. Therefore, the service requester may require auto scaling to be performed on the NS, for example, require the NS to be scaled to a high-indicator flavor B. The flavor B requires that the VNF1 includes two instances, and the VNF2 includes two instances.

Step 603: The NFVO adds a new instance of a VNF1 according to a deployment configuration parameter of the VNF1 in a deployment flavor used during the scaling, where the newly added instance of the VNF1 includes one connection point.

Specifically, the NFVO obtains a scaling requirement of the VNF1 according to a deployment configuration parameter in the deployment flavor B to which the network service needs to be scaled. For example, the NFVO determines that one instance needs to be added for the VNF1. Based on this scaling requirement, the new instance is added for the VNF1. For a specific process, refer to FIG. 7, and the process is described in the following content. The newly added instance of the VNF1 includes the connection point. Information about the connection point includes an address of a virtual network adapter and a virtual port number.

Step 605: The NFVO obtains modification policy information of a first VL (VL1) from a service flavor B. Specifically, the modification policy of the VL1 is obtained from a VNF description parameter in the deployment flavor.

The modification policy of the VL1 indicates whether a type and a connection point of an instance of the VL1 can be changed, and may further indicate a specific modification method, including a type to which the virtual link is changed and a quantity of added connection points.

Step 607: Determine, based on the modification policy of the VL1, whether an instance of the VL1 can be modified; and if the policy information of the VL1 indicates that the instance of the VL1 can be modified, perform step 609; or if the modification policy of the VL1 indicates that the original instance of the VL1 cannot be modified, perform step 615.

The following step 609 to step 611 and step 615 to step 621 respectively describe two specific processes of generating descriptor of a second virtual link based on two different modification policies of the instance of the VL1 and the information about the connection point of the newly added instance of the VNF1.

Step 609: Obtain descriptor of the VL1 when the instance of the VL1 can be modified.

A specific manner may be: obtaining an identifier of the VL1, and searching a database of the NFV system for the descriptor (VLD1) of the VL1 according to the identifier of the VL1. The database returns the VLD1 information to the NFVO. The VLD1 includes a type of the VL1 and a quantity of connection points, and may further include information such as an ID or a port of a specific connection point.

Step 611: Modify the VLD1 information according to the modification policy of the VL1 and information about the connection point of the newly added instance of the VNF1. Main modifications include: changing a connection type in the VLD1 according to a type that is indicated in the modification policy and to which a VL can be changed, and adding the information about the connection point of the new instance of the VNF1 to information about a connection point. VLD information after updating is referred to as second VLD information (VLD2).

Then, the VLD2 information may be sent to the database for storage.

Optionally, to generate the descriptor (VLD2) of the second virtual link of the service after scaling, the VLD2 may not be generated by first searching for the VLD1 and then modifying the VLD1, but the VLD2 may be directly generated by the NFVO according to types and a quantity of VNF instances included in the service that are obtained after scaling and the modification policy of the VL1.

Step 613: The NFVO requests, by using VLD2 information, a VIM to perform resource updating on the instance of the VL1, to create an instance of a second VL (VL2), and connects the newly added instance of the VNF1 to an instance of a VNF2 by using the instance of the VL2.

The resource updating mainly includes updating a VL connection type, newly adding a connection point, and the like. After the VIM completes the resource updating, a new port of the instance of the VL2 connects a port of the newly added instance of the VNF1 to a port of the instance of the VNF2 according to required bandwidth. Original connection points of the VL2 are connected to the original instance of the VNF1 and the instance of the VNF2.

Then, the NFVO returns an auto scaling success response to the requester.

Step 615: When the instance of the VL1 cannot be modified, obtain descriptor (VNFD2) of a VNF2 that is connected by using the VL1 and that is at a peer end of the VNF1.

Specifically, a VNFM 404 may be searched for the descriptor (VNFD2) of the VNF2 according to an identifier of the VNF2. The descriptor of the VNF2 includes at least one deployment flavor of the VNF2. One of the at least one deployment flavor of the VNF2 includes an indication indicating whether a connection point can be added for the VNF2, or a quantity of connection points that can be added.

Step 617: Determine, according to the descriptor of the VNF2, whether at least one deployment flavor (VNF2 deployment flavor) of the VNF2 includes a deployment flavor that is of the VNF2 and that matches a deployment flavor used during the network service scaling; and if there is a matching deployment flavor of the VNF2, perform step 619; or if there is no matching deployment flavor of the VNF2, perform step 625.

According to the deployment configuration parameter in the deployment flavor used during the network service scaling, a scaling quantity of the VNF1 is obtained and it is learned that the instance of the VL1 cannot be modified. Then, it needs to be determined whether there is a deployment flavor that is of the VNF2 and that matches the deployment configuration parameter. Specifically, when the VNF2 connected to the VL1 includes multiple deployment flavors, if one of the deployment flavors of the VNF2 satisfies that a quantity of connection points that can be added is greater than or equal to the quantity of newly added instances of the VNF1, it is determined that the deployment flavor of the VNF2 can match the deployment flavor used during the service scaling. Because the matching deployment flavor of the VNF2 can satisfy the modification policy of the VL1 and the scaling requirement of the VNF1, resource updating is performed on the instance of the VNF2 by using the deployment flavor of the VNF2.

Step 619: When there is a deployment flavor that is of the VNF2 and that matches the deployment flavor used during the service scaling, a VNFM 404 performs resource updating on the instance of the VNF2 by using a deployment configuration parameter in the matching deployment flavor of the VNF2. The resource updating mainly includes adding a specified quantity of connection points. Each newly added connection point is used to connect to one newly added instance of the VNF1. A quantity of added connection points of the VNF2 is equal to the quantity of newly added instances of the VNF 1.

Step 621: The NFVO generates descriptor (VLD2) of a second VL (VL2) according to information about the connection point of the newly added instance of the VNF1 and information about a new connection point of the instance that is of the VNF2 and that is obtained after the resource updating.

A method for generating the descriptor of the VL2 includes: querying and copying the descriptor of the VL1, replacing information, in the descriptor of the VL1, about a connection point of the original instance of the VNF1 with the information about the connection point of the newly added instance VNF1, and replacing information, in the descriptor of the VL, about an original connection point of the instance of the VNF2 with the information about the new connection point of the instance that is of the VNF2 and that is obtained after the resource updating, to generate the descriptor of the VL2, and sending the descriptor of the VL2 to a database for storage.

Another method for generating the descriptor of the VL2 includes: directly generating, by the NFVO, the descriptor of the VL2 according to information about a connection point that needs to be connected to a virtual link, for example, the information about the connection point of the newly added instance of the VNF1, the information about the new connection point of the instance that is of the VNF2 and that is obtained after the resource updating, and a preset rule of a VL type.

When the quantity of newly added instances of the VNF1 is greater than 1, correspondingly, a same quantity of pieces of descriptor of the VL2 may be generated. Each piece of descriptor of the VL2 is generated according to corresponding information about a connection point of a newly added instance of the VNF1 and information about a new connection point of the instance that is of the VNF2 and that is obtained after the resource updating.

Step 623: The NFVO requests to create an instance of the second VL (VL2) by using the descriptor of the VL2, and connects the newly added instance of the VNF1 to the instance of the VNF2 by using the instance of the VL2. A process of creating the instance of the VL2 is a process of instantiating the instance of the VL2.

After resource allocation is completed, the instance of the VL2 connects the newly added instance of the VNF1 to the instance of the VNF2. Then, the NFVO returns an auto scaling success response to the requester.

Step 625: If there is no deployment flavor that is of the VNF2 and that matches the deployment flavor used during the service scaling, the NFVO returns an error prompt to the requester. For example, the prompt may be that "the VL policy does not match a relevant VNF capability". In this case, the new instance of the VNF1 is not connected to the instance of the VNF2.

Step 627: If the requester determines that auto scaling still needs to be performed on the network service, the requester sends an NSD update request to a database, to update the modification policy of the VL1 in the service deployment flavor to be that the instance of the VL1 can be modified.

Specifically, a setting of the modification policy of the VL is described in step 601 and step 605, and details are not described herein again. That is, the original modification policy of the VL of the requester is that the instance of the VL1 is not modified. However, because the deployment flavor of the VNF2 does not match the deployment flavor used during the service scaling, after the error prompt is received, only a method for updating the modification policy of the VL1 can be used. Generally, the NFV system is capable of modifying a deployment configuration parameter of a VL, but is incapable of modifying a VNFD. Therefore, when the deployment flavor of the VNF2 does not match the deployment flavor used during the service scaling, modification of modification policy information of the VL may be considered.

After the database returns an NSD modification success response, the requester may re-initiate a scaling request, and step 601 is performed again.

Figure 7:
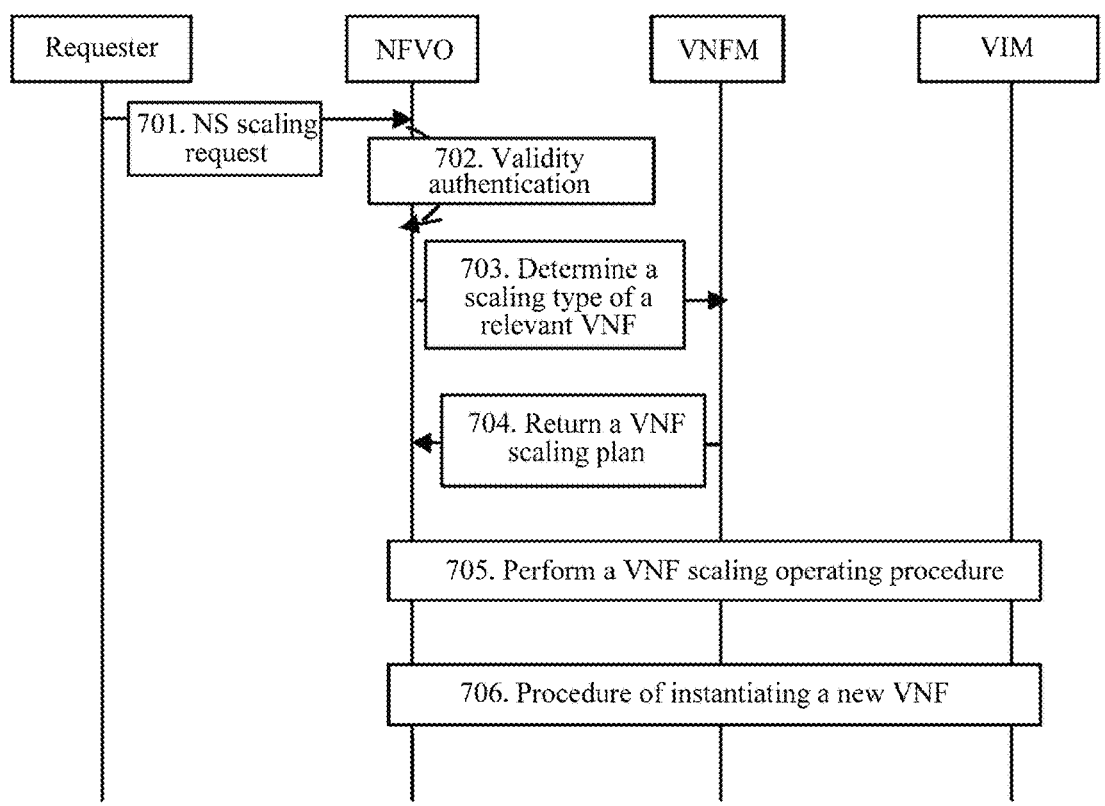
FIG. 7 is a flowchart of performing auto scaling on a network service instance in an NFV system according to an embodiment of the present invention.

FIG. 7 is a flowchart of initiating auto scaling on a network service instance in an NFV system. This may be used as a specific implementation process of adding a new VNF instance in step 601 and step 603.

Step 701: A requester sends a network service (NS) scaling request to an NFVO, where the scaling request includes information about a flavor B to which a network service needs to be scaled and an identifier of the NS instance. The NS instance is originally deployed according to a flavor A.

Step 702: As an orchestrator of the NFV system, the NFVO performs authentication on the scaling request.

Step 703: The NFVO determines whether a relevant VNF needs resource scaling or quantity scaling. The scaling request may require resource scaling to be performed on a VNF instance. For example, in this service, although both the flavor B and the flavor A require only two instances of a VNF2, the flavor B may require a resource such as a CPU of an instance of the VNF2 to be scaled, instead of requiring a quantity of instances of the VNF2 to be scaled. After a VNF and a quantity of instances that correspond to the VNF that are required by the flavor B are analyzed, if it is determined that the quantity of instances of the VNF needs to be increased, step 704 is then performed.

Step 704: If quantity scaling needs to be performed on a VNF, and in this embodiment, the flavor B requires one new instance of a VNF1 to be added, a VNFM returns a specific scaling plan to the NFVO.

Step 705: The NFVO, the VNFM, and a VIM perform a scaling operating procedure for the VNF 1.

Step 706: Instantiate the new instance of the VNF1. The NFVO sends an instantiation request to the VNFM. The VNFM requests a resource of the new instance from the VIM by using the NFVO, to complete resource updating.

Figure 8:
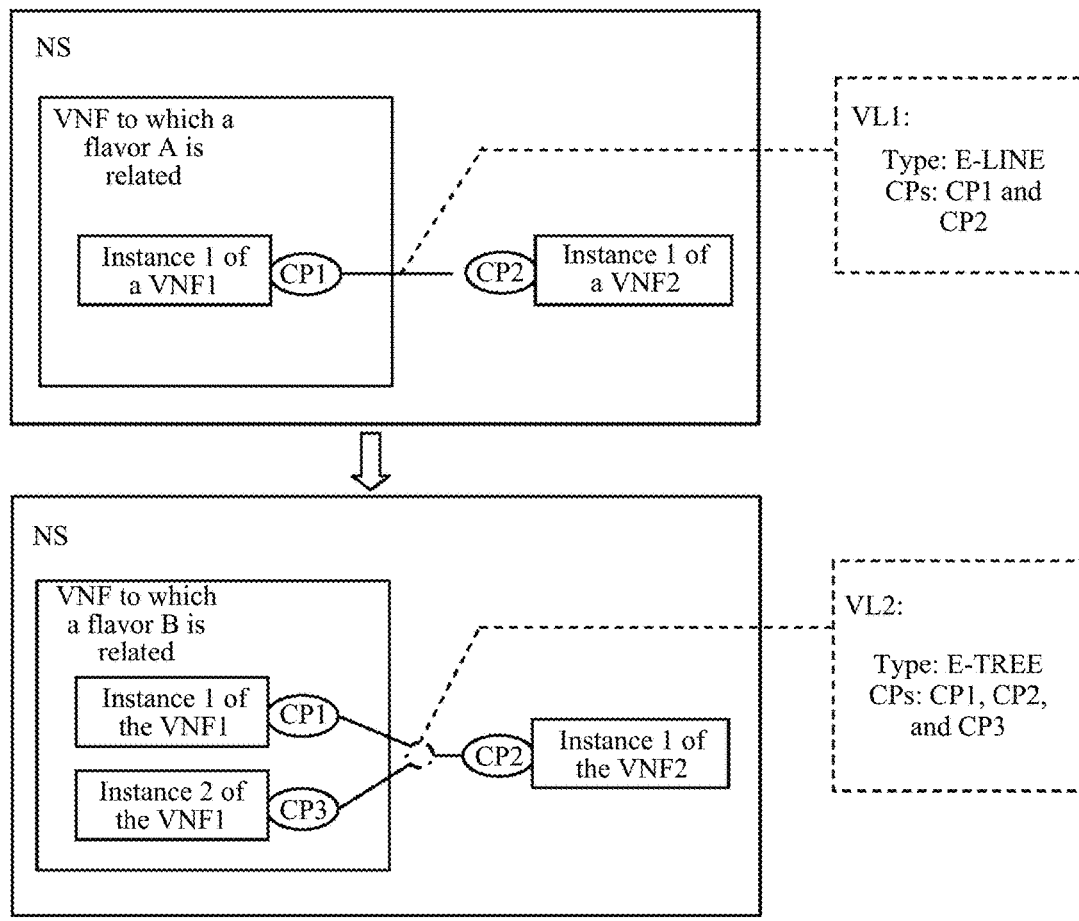
FIG. 8 is a schematic diagram of virtualized network functions and connections before and after network service scaling according to an embodiment of the present invention.

As shown in FIG. 8, FIG. 8 is a schematic diagram of virtualized network functions and connections before and after network service scaling. In this embodiment, an NS includes two VNFs. A VNF1 is a VNF to which an initial deployment flavor A is related. During initial deployment, only one instance of the VNF1 and one instance of a VNF2 need to be connected. A type of a VL1 between the instance of the VNF1 and the instance of the VNF2 is E-LINE, and two connection points: a CP1 and a CP2 are included. When the service is automatically scaled to a flavor B, the virtual link between the instance of the VNF1 and the instance of the VNF2 may be changed to an E-TREE type according to a modification policy of the VL1, and three connection points: the CP1, the CP2, and a CP3 are included, so that three VNF instances can be connected.

Figure 9:
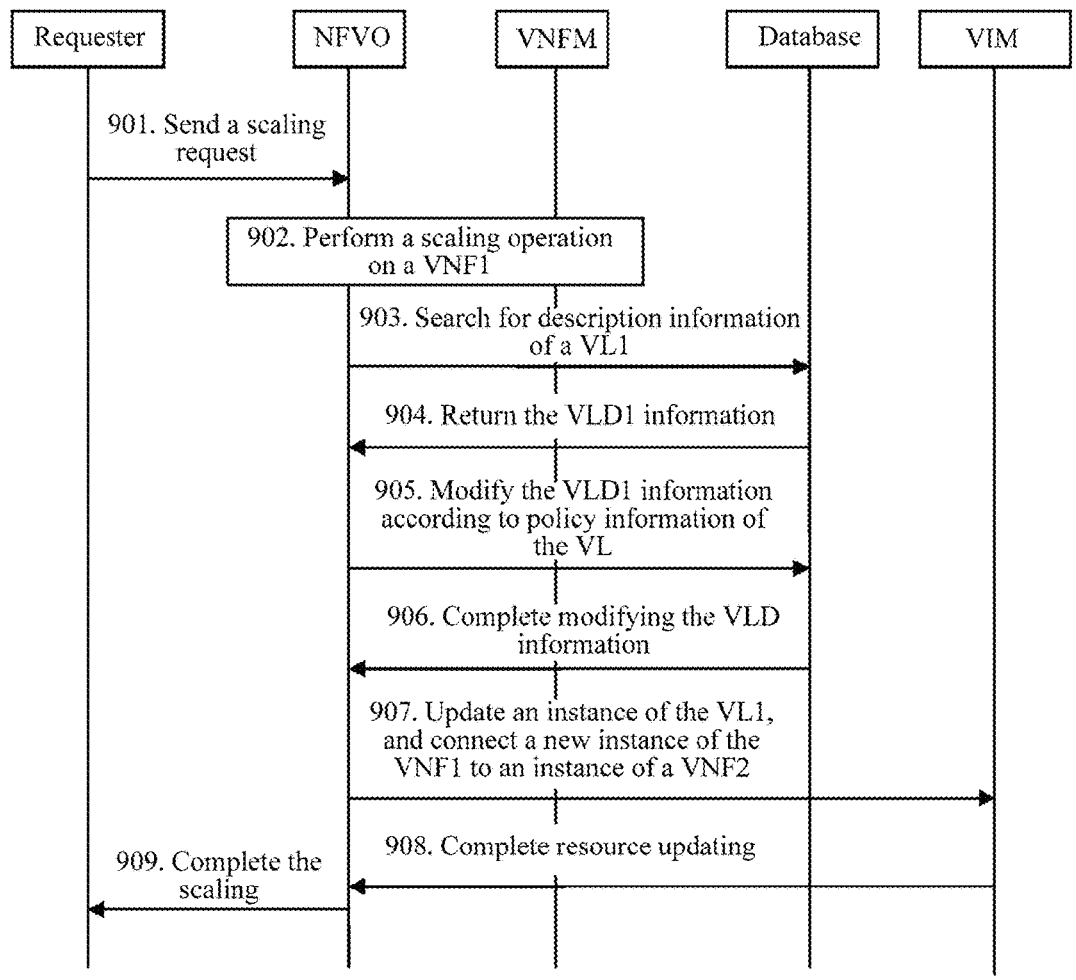
FIG. 9 is a schematic flowchart of network service scaling in a scenario in FIG. 8 according to an embodiment of the present invention.

FIG. 9 is a schematic flowchart of a specific embodiment of network service scaling in a scenario shown in FIG. 8. A procedure of this embodiment includes the following steps.

Step 901: A requester sends a service auto scaling request to an NFVO, where the scaling request includes an identifier of a network service deployment flavor B to which a network service needs to be scaled and that is shown in FIG. 8. Parameters of the flavor B are obtained according to the identifier of the flavor B.

Specifically, the deployment flavor B may include a deployment flavor identifier (flavor ID), a service indicator, and a constituent VNF of the network service. There may be multiple constituent VNFs of the service, for example, a VNF1 and a VNF2. This indicates that the flavor B has a resource configuration requirement on multiple VNFs. Specific resources needing to be configured include a CPU, a memory, a virtual machine, and the like.

The deployment flavor may include deployment configuration parameters in the following table:

| Parameter name | Type | Quantity | Explanation |
| --- | --- | --- | --- |
| ID | Leaf type | 1 | Identifier of the flavor |
| Flavor_key | Leaf type | 1 | Indicator corresponding to the flavor, for example, a quantity of calls connected per second |
| Constituent_VNF | Element type | 1, . . . , or N | Constituent VNF of the flavor |

Parameters of the constituent VNF may further include the following deployment configuration parameters:

| Parameter name | Type | Quantity | Explanation |
| --- | --- | --- | --- |
| VNF identifier | Identifier | 1 | Identifier of a VNF |
| VNF deployment flavor | Identifier | 1 | It indicates a deployment flavor of the VNF, such as CPU resource information of a relevant virtual machine and a quantity of connection points; different deployment flavors include different information |
| Quantity | Leaf node | 1 | Quantity of instances that is required by the VNF |
| Relevant_VL | Element node | 1, . . . , or N | Modification policy of a VL connected to the VNF |

In this embodiment, a relevant VL "relevant_VL" parameter is added to the "Constituent_VNF" parameter, and is used to carry modification policy information, used during auto scaling, of a VL connected to the VNF.

The relevant_VL may further include the following parameters:

| Parameter name | Type | Quantity | Explanation |
| --- | --- | --- | --- |
| VL identifier | Identifier | 1 | Identifier information that is of a corresponding VL and that may be used to search for VLD information of the VL |

-continued

| Parameter name | Type | Quantity | Explanation |
|---|---|---|---|
| Modification policy | Leaf node | 1 | Modification policy, used during auto scaling, of the VL, for example, Type: change Method: change type to E-TREE Adding 1 CP at leaf |

The modification policy of the VL indicates whether a type and a connection point of an instance of the VL can be changed, and may further indicate a specific modification method, including a type to which the virtual link can be changed and a quantity of added connection points. When the examples in the foregoing table indicate that during auto scaling, a type of the VL1 can be changed to E-TREE, and one connection point can be added for the VL1. A virtual link is a connection between constituent devices in an NFV system. Although a virtual link is defined at delivery, generally, the VL can be modified by a system platform. In comparison, a VNF cannot be modified by the system platform, but is specified by a VNFD that is set by a manufacturer.

Step 902: The NFVO receives the scaling request, and performs an auto scaling operation on a VNF1 based on a deployment flavor used during service scaling, and adds an instance 2 of the VNF1, where a connection point: a CP3 is included. This operation has been described in step 702 to step 706 in FIG. 7.

Step 903: The NFVO obtains a relevant VL (relevant_VL) parameter from the service deployment flavor, where the relevant VL parameter includes a modification policy of a VL1; determines, according to the modification policy, that an instance of the VL1 can be modified; and obtains an identifier of the VL1 from the relevant_VL parameter, and searches a database for descriptor VLD1 of the VL1 by using the identifier of the VL1.

Step 904: The database returns the VLD1 information to the NFVO, where the VLD1 includes a type of the VL and a quantity of connection points of the VL.

Step 905: Modify the VLD1 information according to the modification policy in the relevant_VL in the scaling request, for example, type change to E-TREE, and information about the connection point: the CP3 of the newly added instance of the VNF1. Main modifications include: changing a type parameter in the VLD1 from E-LINE to the E-TREE, and adding the information about the connection point: the CP3 of the new instance of the target VNF to included information about a connection point, and sending VLD2 information that is obtained after modification to the database, to perform VLD updating.

Step 906: The database completes storing VLD2. Specifically, because the VLD2 may include the identifier of the VL1, the VLD1 may be found according to the identifier of the VL1, and the VLD1 information is replaced with the VLD2 information. After the VLD updating is completed, the database returns a completion response to the NFVO.

Step 907: The NFVO requests, by using the VLD2 information, a VIM to perform resource updating on the instance of the VL1. The resource updating mainly includes updating a connection type, adding a connection point, and the like. Resource updating on the connection type of the VL is that the E-LINE is changed to the E-TREE in this embodiment, and a virtual router resource needs to be used. To add a connection point, resources such as a port, a port type, and bandwidth need to be added. An instance that is of a VL2 and that is obtained after updating is further connected to the newly added instance of the VNF1, that is, the instance 2 of the VNF1. A new port of the instance of the VL2 connects a port of the newly added instance of the VNF1 to a port of an instance of the VNF2 according to required bandwidth.

Step 908: The VIM completes resource updating. In this way, the VL2 completes connecting the two instances of the VNF1 to an instance of a VNF2.

Step 909: The NFVO returns an auto scaling success response to the requester.

Figure 10:
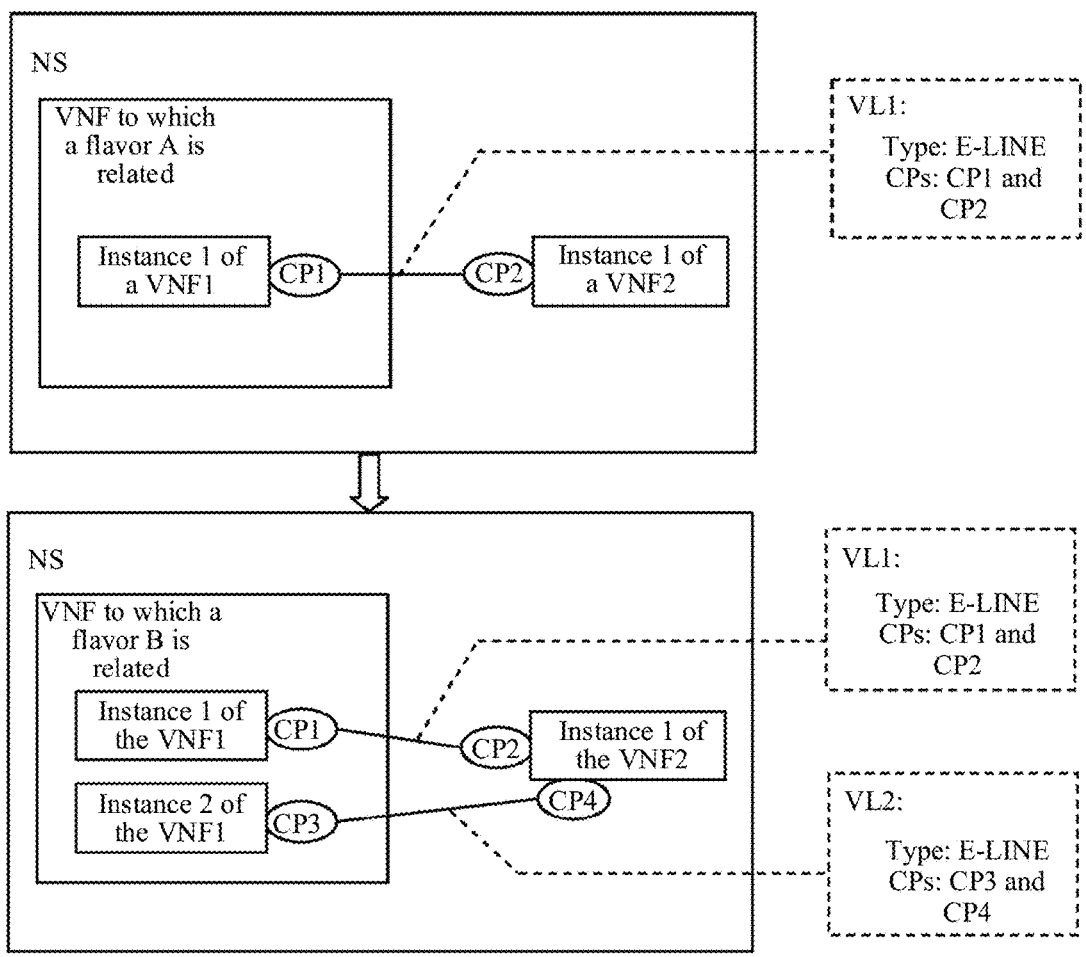
FIG. 10 is a schematic diagram of virtualized network functions and connections before and after network service scaling according to another embodiment.

As shown in FIG. 10, FIG. 10 is a schematic diagram of virtualized network functions and connections before and after network service scaling according to another embodiment. In this embodiment, an NS includes one instance of a VNF1 and one instance of a VNF2. The VNF1 is a VNF to which an initial deployment flavor A is related. A type of a VL1 connecting the two instances is E-LINE, and two connection points: a CP1 and a CP2 are included. When the service is automatically scaled to a flavor B, an instance 2 is newly added for the VNF1, and there is one connection point: a CP3. Because a modification policy of the VL1 is that an original VL instance is not modified, a new connection point: a CP4 needs to be added for an instance 1 of the VNF2. The connection point is used to connect to the CP3 of the instance 2 of the VNF1, to create an instance of another virtual link: a VL2.

Figure 11:
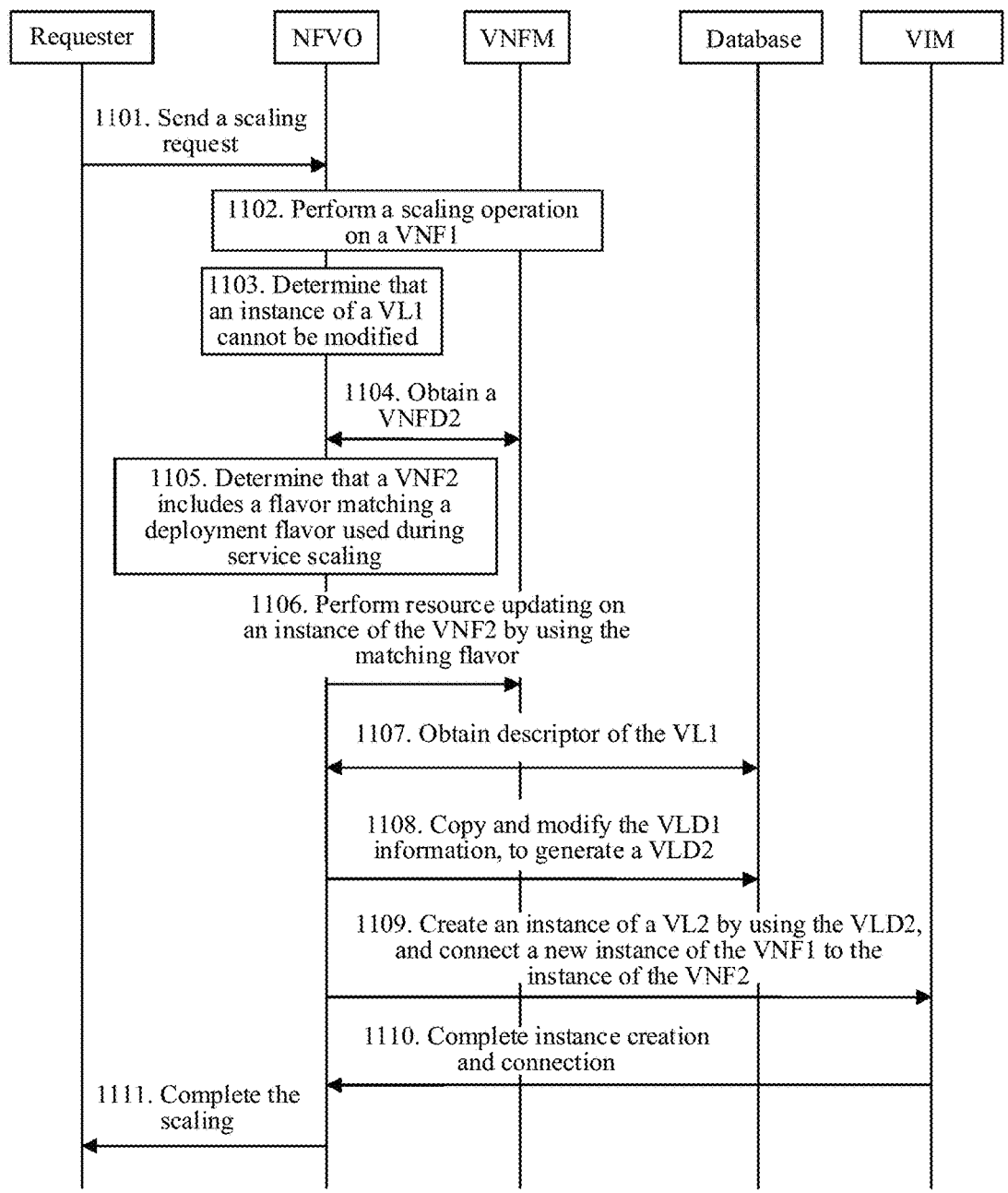
FIG. 11 is a schematic flowchart of network service scaling in a scenario in FIG. 10 according to an embodiment of the present invention.

FIG. 11 is a schematic flowchart of a specific embodiment of network service scaling in a scenario shown in FIG. 10. A procedure of this embodiment includes the following steps.

Step 1101: A service requester sends a service auto scaling request to an NFVO, where the scaling request includes information about a service deployment flavor to which a service needs to be scaled, for example, an ID of a flavor B. Configuration parameters of the flavor B are obtained according to the ID of the flavor B. For a data structure of a specific parameter, refer to the descriptions in step 901. A difference between this step and step 901 is that specific settings of modification policies in relevant_VL are different.

In this embodiment, relevant parameters of the relevant_VL are as follows:

| Parameter name | Type | Quantity | Explanation |
|---|---|---|---|
| VL identifier | Identifier | 1 | Identifier information that is of a corresponding VL and that may be used to search for VLD information of the VL |
| Modification policy | Leaf node | 1 | Modification policy, used during auto scaling, of the VL, for example, Type: unchanged |

The NFVO learns, from a description parameter of a VNF, that a modification policy of a VL1 is that an original instance of the VL1 cannot be modified.

Step 1102: Perform a scaling operation on a VNF1 based on a VNF requirement in the service deployment flavor, and add an instance 2 of the VNF1, where one connection point: a CP3 is included. This step is the same as step 902.

Step 1103: Determine that a modification policy in relevant_VL in the deployment flavor used during the service scaling is that an original VL instance cannot be modified.

As shown in FIG. 10, after the instance 2 of the VNF1 is newly added, the instance of the VL1 keeps unchanged. In some scenarios in which no service interruption needs to be ensured, generally, a policy of not modifying a VL instance is used.

Step 1104: Obtain, from a VNFM, descriptor of a VNF2 that is connected to a VL1 and that is at a peer end of the VNF1.

Specifically, an identifier of the VNF2 may be obtained, and a VNFM 404 may be searched for the descriptor (VNFD2) of the VNF2 by using the identifier of the VNF2. The VNFM returns the descriptor of the VNF2. The descriptor of the VNF2 includes at least one deployment flavor of the VNF2. One or more deployment flavors of the VNF2 indicate whether a connection point can be added for the VNF2, or a quantity of connection points that can be added.

Step 1105: Determine, according to the found descriptor of the VNF2, that deployment flavors of the VNF2 include a deployment flavor that is of the VNF2 and that matches the deployment flavor used during the service scaling. Specifically, if a quantity of new connection points that can be added for the VNF2 in a deployment flavor of the VNF2 is greater than or equal to a quantity 1 of newly added instances of the VNF1, the deployment flavor of the VNF2 can match the modification policy of the VL1 and a scaling requirement of the VNF1.

Step 1106: Perform resource updating on an instance of the VNF2 by using the matching deployment flavor of the VNF2, where the resource updating includes adding a connection point: a CP4 for the VNF2. The connection point may be added by newly adding a virtual network adapter and configuring a corresponding port, a corresponding port type, and corresponding bandwidth.

Step 1107: Obtain descriptor VLD1 of the VL1 from a database.

Step 1108: The NFVO copies and modifies the obtained VLD1 information, to generate VLD2 information. Specifically, information about an original connection point: a CP1 in the VLD1 is replaced with information about the connection point: the CP3 of the instance 2 of the VNF1, and information about an original connection point: a CP2 in the VLD1 is replaced with information about the new connection point: the CP4 of the instance 1 of the VNF2, to generate the descriptor VLD2 of a VL2. Then, the VLD2 information is sent to the database for storage. The VLD2 information further includes an identifier of the VL2.

Step 1109: The NFVO instantiates a new instance of a VL (VL2) by using the VLD2 information, and requests a VIM to connect the CP3 of the instance 2 of the VNF1 to the CP4 of the instance 1 of the VNF2 by using the instance of the VL2. When creating the instance of the VL2 according to the descriptor of the VL2, the VIM needs to configure resources such as a port, a port type, and bandwidth for the VL2.

Step 1110: The VIM completes creating the instance of the VL2 and connecting the CP3 to the CP4.

Step 1111: The NFVO returns an auto scaling success response to the requester.

Optionally, in step 1105, if the deployment flavors of the VNF2 do not include a flavor that is of the VNF2 and that matches the deployment flavor used during the service scaling, that is, a connection point can be added for the VNF2 in none of the deployment flavors, or a quantity of connection points that can be added is less than a quantity of newly added instances of the VNF, the NFVO returns an error prompt to the requester. Specific procedures are the same as those in step 625 and step 627, and details are not described herein again.

In another scenario, if the VL1 is connected to an instance of a VNF3 in addition to the instance of the VNF1 and the instance of the VNF2, in step 1104, descriptor of the VNF3 further needs to be obtained, and in step 1105, it further needs to be determined, according to the descriptor of the VNF3, whether the descriptor of the VNF3 includes a deployment flavor that is of the VNF3 and that matches deployment flavor information used during the network service scaling. If the descriptor of the VNF3 includes a deployment flavor that is of the VNF3 and that matches the deployment flavor information used during the network service scaling, resource updating is performed on the instance of the VNF3 by using the matching deployment flavor of the VNF3. The resource updating mainly is adding a connection point of the VNF3. In step 1108, to generate the VLD2, the information about the connection point of the new instance of the VNF1, the information about the newly added connection point of the instance of the VNF2, and information about the newly added connection point of the VNF3 need to be used. In step 1109, the instance of the VL2 is created by using the VLD2. The new instance of the VNF1, the instance of the VNF2, and the instance of the VNF3 are connected by using the instance of the VL2.

If either the VNF2 or the VNF3 does not include a deployment flavor matching the deployment flavor information used during the service scaling, the current scaling cannot succeed. Subsequent processes are the same as those in step 625 and step 627.

Figure 12:
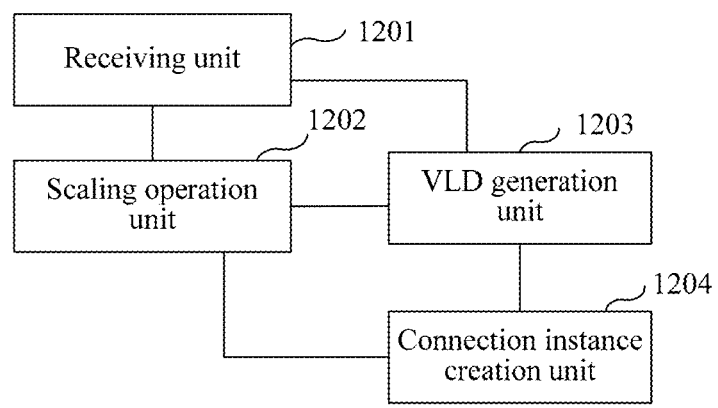
FIG. 12 a simplified function block diagram of a computer apparatus in an NFV system.

FIG. 12 a simplified function block diagram of a computer apparatus in an NFV system. The computer apparatus is configured to perform network service scaling.

The computer apparatus includes a receiving unit 1201, a scaling operation unit 1202, a VLD generation unit 1203, and a connection instance creation unit 1204.

The receiving unit 1201 is configured to receive a network service scaling request, where the scaling request includes a deployment flavor identifier used during the network service scaling, the network service includes an instance of a first virtualized network function and an instance of a second virtualized network function, and the instance of the first virtualized network function and the instance of the second virtualized network function are connected by using an instance of a first virtual link.

The scaling operation unit 1202 is configured to: obtain a deployment flavor of the network service according to the deployment flavor identifier, where the deployment flavor includes a deployment configuration parameter of the network service, and add a new instance of the first virtualized network function according to the deployment configuration parameter, where the new instance of the first virtualized network function includes one connection point.

The VLD generation unit 1203 is configured to: obtain a modification policy of the first virtual link according to the deployment configuration parameter, and generate descriptor of a second virtual link based on the modification policy of the first virtual link and information about the connection point of the new instance of the first virtualized network function.

The connection instance creation unit 1204 is configured to create an instance of the second virtual link according to the descriptor of the second virtual link, where the instance of the second virtual link connects the new instance of the first virtualized network function to the instance of the second virtualized network function.

Optionally, when the modification policy of the first virtual link (VL1) indicates that the instance of the VL1 can be modified, the VLD generation unit 1203 is specifically configured to: obtain descriptor of the VL1, and change a type and information about a connection point in the descriptor of the VL1 according to the modification policy of the VL1 and the information about the connection point of the new instance of the VNF1, to generate the descriptor of the second virtual link (VL2).

The connection instance creation unit 1204 is specifically configured to perform resource updating on the instance of the VL1 by using the descriptor of the VL2, to create the instance of the VL2.

Optionally, when the modification policy of the first virtual link (VL1) indicates that the instance of the VL1 cannot be modified, the scaling operation unit 1202 is further configured to: obtain descriptor of the second virtualized network function (VNF2); determine, according to the descriptor of the VNF2, that the VNF2 includes a deployment flavor matching the deployment flavor used during the network service scaling; and perform resource updating on the instance of the VNF2 by using the matching deployment flavor of the VNF2, where the resource updating includes adding a connection point.

The determining that the VNF2 includes a deployment flavor matching the deployment flavor used during the network service scaling specifically includes: determining that a deployment configuration parameter in a deployment flavor of the VNF2 indicates that a quantity of connection points that can be added for the second virtualized network function is greater than or equal to a quantity of new instances of the VNF 1.

The VLD generation unit 1203 is specifically configured to generate the descriptor of the VL2 according to the information about the connection point of the new instance of the VNF1 and information about a newly added connection point of the instance of the VL2. Specifically, the VLD generation unit 1203 is configured to: obtain descriptor of the first virtual link; and replace information, in the descriptor of the VL1, about a connection point of the original instance of the VNF1 with the information about the connection point of the new instance of the VNF1, and replace information, in the descriptor of the VL1, about an original connection point of the instance of the VNF2 with the information about the newly added connection point of the instance of the VNF2, to generate the descriptor of the VL2.

The connection instance creation unit 1204 is specifically configured to instantiate the instance of the VL2 by using the descriptor of the VL2. The instance of the VL2 is used to connect the newly added instance of the VNF1 to the instance of the VNF2.

For a specific implementation of an operation performed by each unit included in the computer apparatus, refer to corresponding steps in the embodiment in FIG. 6, and details are not described herein again.

It should be noted that the computer apparatus 1200 is presented in a form of a functional unit. The term "unit" used in this specification may be, if not limited, an application-specific integrated circuit (ASIC), an electronic circuit, a (shared, dedicated, or combined) processor and memory, or a combinatorial logic circuit that executes one or more software or firmware programs, and/or another suitable component that provides the function. In a very particular example, persons skilled in the art may learn that the computer apparatus may use a form of the network element 500 in FIG. 5. The receiving unit 1201 may be implemented by using the transceiver 510 and the port 512. The scaling operation unit 1202 may be implemented by using the processor 502 and the memory 504. Specifically, the processor 502 executes a first instruction in the memory 504 to obtain a deployment flavor that corresponds to a deployment flavor identifier used during scaling, where the deployment flavor includes a deployment configuration parameter of a network service; and executes a second instruction to add a new instance of a first virtualized network function. The VLD generation unit 1203 may be implemented by using the processor 502 and the memory 504. Specifically, the processor 502 executes a third instruction in the memory 504 to generate descriptor of a second virtual link. The connection instance creation unit 1204 executes a fourth instruction by using the processor 502, to create an instance of the second virtual link.

Persons of ordinary skill in the art should understand that all or some subject matters in this application may be implemented in software combined with hardware and/or firmware. For example, the subject matters described in this specification may be implemented in software that is executed by one or more processors. In an example implementation, the subject matters described in this specification may be implemented by using a non-transitory computer readable medium that stores a computer executable instruction. When a computer processor executes the computer executable instruction, the instruction controls the computer to perform steps. An example of a computer readable medium suitable for implementing the subject matters described in this specification includes a non-transitory computer readable medium such as a magnetic disk storage device, a chip memory device, a programmable logic device, or an application-specific integrated circuit. In addition, the computer readable medium that implements the subject matters described in this specification may be located on a single device or computing platform, or may be distributed on multiple devices or computing platforms.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A network service scaling method, comprising:
receiving a network service scaling request, wherein the network service scaling request comprises a deployment flavor identifier used during a network service scaling for a network service, the network service comprises an instance of a first virtualized network function and an instance of a second virtualized network function, and the instance of the first virtualized network function and the instance of the second virtualized network function are connected by an instance of a first virtual link;
obtaining a deployment flavor of the network service according to the deployment flavor identifier, wherein the deployment flavor comprises a deployment configuration parameter of the network service;
adding a new instance of the first virtualized network function according to the deployment configuration parameter, wherein the new instance of the first virtualized network function comprises one connection point;
obtaining a modification policy of the first virtual link according to the deployment configuration parameter;

generating a descriptor of a second virtual link based on the modification policy of the first virtual link and information about the one connection point of the new instance of the first virtualized network function; and creating an instance of the second virtual link based on the descriptor of the second virtual link, wherein the instance of the second virtual link connects the new instance of the first virtualized network function to the instance of the second virtualized network function.

2. The method according to claim 1, wherein the modification policy of the first virtual link indicates a type for the first virtual link to be changed to and a quantity of connection points to be added.

3. The method according to claim 2, wherein the generating the descriptor of the second virtual link based on the modification policy of the first virtual link and information about the one connection point of the new instance of the first virtualized network function comprises:

obtaining a descriptor of the first virtual link according to the deployment configuration parameter; and changing a type and information about a connection point in the descriptor of the first virtual link according to the modification policy of the first virtual link and the information about the one connection point of the new instance of the first virtualized network function, to generate the descriptor of the second virtual link.

4. The method according to claim 1, wherein the creating the instance of the second virtual link based on the descriptor of the second virtual link comprises:

performing resource updating on the instance of the first virtual link by using the descriptor of the second virtual link to create the instance of the second virtual link.

5. The method according to claim 1, further comprising:

in response to the modification policy of the first virtual link indicating that the instance of the first virtual link cannot be modified:

obtaining the descriptor of the second virtualized network function;

determining, according to the descriptor of the second virtualized network function, that the second virtualized network function comprises a deployment flavor matching the deployment flavor used during the network service scaling; and performing resource updating on the instance of the second virtualized network function according to a deployment configuration parameter in the matching deployment flavor of the second virtualized network function, wherein the resource updating comprises adding a connection point.

6. The method according to claim 5, wherein the determining that the second virtualized network function comprises the deployment flavor matching the deployment flavor used during the network service scaling comprises:

determining that a deployment flavor of the second virtualized network function satisfies that a quantity of connection points to be added for the second virtualized network function is greater than or equal to a quantity of new instances of the first virtualized network function.

7. The method according to claim 5, further comprising:

in response to the instance of the first virtual link being further connected to an instance of a third virtualized network function:

determining that a descriptor of the third virtualized network function comprises a deployment flavor matching the deployment flavor used during the network service scaling; and performing resource updating on the instance of the third virtualized network function according to a deployment configuration parameter in the matching deployment flavor of the third virtualized network function.

8. The method according to claim 5, wherein the generating the descriptor of the second virtual link based on the modification policy of the first virtual link and information about the one connection point of the new instance of the first virtualized network function specifically comprises:

generating the descriptor of the second virtual link according to the information about the one connection point of the new instance of the first virtualized network function and information about a newly added connection point of the instance of the second virtualized network function.

9. The method according to claim 8, wherein the generating the descriptor of the second virtual link according to the information about the one connection point of the new instance of the first virtualized network function and information about the newly added connection point of the instance of the second virtualized network function comprises:

obtaining a descriptor of the first virtual link; and replacing information, in the descriptor of the first virtual link, about a connection point of the instance of the first virtualized network function with the information about the one connection point of the new instance of the first virtualized network function; and replacing information, in the descriptor of the first virtual link, about an original connection point of the instance of the second virtualized network function with the information about the newly added connection point of the instance of the second virtualized network function, to generate the descriptor of the second virtual link.

10. The method according to claim 8, wherein the creating the instance of the second virtual link based on the descriptor of the second virtual link comprises: instantiating the instance of the second virtual link by using the descriptor of the second virtual link.

11. A network service scaling network element, comprising:

a memory, configured to store computer executable program code;

a transceiver; and a processor, coupled to the memory and the transceiver; wherein the program code comprises an instruction, wherein when the processor executes the instruction, the instruction enables the network element to perform operations comprising:

receiving a network service scaling request by using the transceiver, wherein the network service scaling request comprises a deployment flavor identifier used during a network service scaling for a network service, the network service comprises an instance of a first virtualized network function and an instance of a second virtualized network function, and the instance of the first virtualized network function and the instance of the second virtualized network function are connected by an instance of a first virtual link;

obtaining a deployment flavor of the network service according to the deployment flavor identifier, wherein the deployment flavor comprises a deployment configuration parameter of the network service;

obtaining a deployment flavor of the network service according to the deployment flavor identifier, wherein the deployment flavor comprises a deployment configuration parameter of the network service;

adding a new instance of the first virtualized network function according to the deployment configuration parameter, wherein the new instance of the first virtualized network function comprises one connection point;

obtaining a modification policy of the first virtual link according to the deployment configuration parameter;

generating a descriptor of a second virtual link based on the modification policy of the first virtual link and information about the one connection point of the new instance of the first virtualized network function; and creating an instance of the second virtual link based on the descriptor of the second virtual link, wherein the instance of the second virtual link connects the new instance of the first virtualized network function to the instance of the second virtualized network function.

12. The network element according to claim 11, wherein the modification policy of the first virtual link indicates a type for the first virtual link to be changed to and a quantity of connection points to be added.

13. The network element according to claim 12, wherein the generating the descriptor of the second virtual link based on the modification policy of the first virtual link and information about the one connection point of the new instance of the first virtualized network function comprises:

obtaining a descriptor of the first virtual link according to the deployment configuration parameter; and changing a type and information about a connection point in the descriptor of the first virtual link according to the modification policy of the first virtual link and the information about the one connection point of the new instance of the first virtualized network function, to generate the descriptor of the second virtual link.

14. The network element according to claim 11, wherein the creating the instance of the second virtual link based on the descriptor of the second virtual link comprises:

performing resource updating on the instance of the first virtual link by using the descriptor of the second virtual link to create the instance of the second virtual link.

* * * * *